United States Patent
Fehrenbach et al.

(10) Patent No.: US 6,469,676 B1
(45) Date of Patent: Oct. 22, 2002

(54) APPARATUS WITH A WAVEGUIDE AND AN ANTENNA

(75) Inventors: Josef Fehrenbach, Haslach; Jürgen Motzer, Gennenbach; Daniel Schultheiss, Hornberg, all of (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 09/564,353

(22) Filed: May 1, 2000

(30) Foreign Application Priority Data

May 17, 1999 (DE) .......................... 199 22 606

(51) Int. Cl.[7] .............................................. H01Q 13/02
(52) U.S. Cl. ....................................................... 343/786
(58) Field of Search ................................ 343/772, 786, 343/785, 781 R, 840; H01Q 13/00, 13/02

(56) References Cited

U.S. PATENT DOCUMENTS

| | | | |
|---|---|---|---|
| 4,940,990 A | 7/1990 | Mostafa et al. ............. | 343/773 |
| 5,017,937 A | 5/1991 | Newham et al. ............ | 343/785 |
| 5,642,121 A * | 6/1997 | Martek et al. .............. | 343/786 |
| 5,872,494 A | 2/1999 | Palan et al. ................ | 333/252 |

FOREIGN PATENT DOCUMENTS

| | | |
|---|---|---|
| DE | G 94 12 243 1 | 11/1994 |
| EP | 0 612 120 A1 | 8/1994 |
| EP | 0 616 385 | 9/1994 |
| WO | WO 83/01711 | 5/1983 |

\* cited by examiner

*Primary Examiner*—Michael C. Wimer
(74) *Attorney, Agent, or Firm*—Foley Hoag LLP

(57) ABSTRACT

An antenna connected to a waveguide can be used for level measurements of a bulk material by measuring the reflection of microwave radiation radiated towards the surface of the bulk material. Condensate droplets forming on the antenna may produce higher modes and echoes in the microwave signal. The effect caused by droplets can be ameliorated by increasing the size of the antenna and the waveguide. To obtain a usable measurement signal, a compromise between reducing the interference from condensate droplets and optimizing the electrical characteristics has to be found. The invention is directed to a waveguide which is designed to propagate at a particular frequency only the fundamental mode, while the antenna itself is capable of supporting higher order modes. A taper which is a dimensioned so as to transmit only the fundamental mode of the microwave signal, is placed between the waveguide and the antenna. At the particular frequency, the taper causes the waveguide/antenna combination to operate in the fundamental mode in spite of the multimode characteristics of the antenna.

12 Claims, 3 Drawing Sheets

APPARATUS WITH A WAVEGUIDE AND AN ANTENNA

FIELD OF THE INVENTION

The invention relates to an apparatus which includes a waveguide and an antenna, and more particularly to an apparatus for measuring a level of bulk material in a container using microwave radiation.

BACKGROUND OF THE INVENTION

Waveguides having a circular or rectangular cross-section—frequently also referred to as circular or rectangular waveguides—are used in HF applications for transmitting HF signals. The interior space of a waveguide can be filled with air or with a solid dielectric material. An antenna, such as a horn or "funnel" antenna, is arranged at one end of a waveguide for radiating the HF signals into free space.

In a large number of antenna designs, the transition between the waveguide and the antenna involves a gradual reduction of the cross-section of the dielectric material accompanied by a gradual outward expansion of the waveguide diameter. This arrangement thereby forms a metallic funnel, with a cone made of a dielectric material placed inside the funnel and the tip of the dielectric material extending into the funnel entrance. The portion of the dielectric material which becomes narrower in the antenna region, is referred to as a cross-sectional adapter or "taper." A waveguide with a rectangular cross-section hence has a taper in the form of a pyramid, whereas the taper of circular waveguides has the form of a cone.

The transmission characteristics of the waveguide depends on the frequency of the signal to be transmitted, on the cross-section of the waveguide and on the relative dielectric constant $\in_r$ of the dielectric material filling the interior space of the waveguide. For a predetermined frequency and a predetermined dielectric material, the diameter or the cross-section of the waveguide is selected so that the transmission and reception characteristics are optimized for the frequency of the transmitted HF signal.

Waveguides having antennas placed at one end of the waveguide are used not only in telecommunication, but also in measurement applications, for example, for measuring a level of a solid bulk material or of a liquid in a container. Level measurements are based on transmitting short microwave pulses from the antenna. Pulses reflected back from the bulk material to the antenna are captured by a combined transmission and reception system (transceiver). The distance between the antenna and the bulk material is determined by measuring the roundtrip propagation time of the pulses reflected by the bulk material. The microwaves inside the container are radiated by an antenna, for example a horn antenna, which is connected to a waveguide. This arrangement eliminates the presence of temperature-sensitive components in the container itself.

Such antenna arrangements for level measurements are described, for example, in the German utility model G 94 12 243.1 assigned to the same assignee as the present application.

When the frequency of the transmitted HF signal and the relative dielectric constant $\in_r$ of the dielectric material filling the waveguide increase, the diameter of the waveguide has to decrease in order to attain optimum transmission characteristics. For example, a circular waveguide which is optimized for a frequency of, for example, 24 GHz and filled with Teflon™ as a dielectric material, has an optimal diameter of approximately 6.5 mm. If Teflon is replaced by aluminum oxide ceramics, then the optimal diameter is reduced to 3 mm.

Level measurements tend to experience problems due to condensate formation in the antenna system. When a condensate droplet forms in the antenna region, for example, on the taper, then a portion of the cross-section of the taper is covered by the droplet. The condensate droplet reflects a portion of the HF signal, which was reflected to the antenna by the surface of the bulk material, back towards the surface of the bulk material. Likewise, the outgoing signal is reflected by the condensate droplet back into the transceiver, with a portion of the reflected signal being reflected again towards the antenna. The reflection back to the surface of the bulk material and/or back to the interior of the apparatus (transceiver) increases with increasing droplet size and increasing relative dielectric constant of the condensate droplet. Moreover, the fraction of the HF signal reflected back to the surface of the bulk material and/or the transceiver also increases with the ratio of the surface area of the taper wetted by the condensate droplets to the total surface area of the taper. For example, a droplet having a diameter of 2 mm covers already approximately 45% of the surface area of the taper of a waveguide filled with a ceramic material at an HF signal frequency of 24 GHz. The resulting strong reflection significantly reduces the amplitude of the measured echo signal, while the interference echo signal, also referred to as "ringing", shows a marked increase.

Reflected measurement signals, which still have sufficient signal strength, can be obtained even in the presence of condensate droplets by employing waveguides having larger dimensions. The resulting larger surface area of the taper decreases the sensitivity to condensate droplets. The transmission and reception characteristics of the waveguide and the antenna, however, may then no longer be optimized for the particular HF signal frequency. A larger waveguide may propagate at the transmission frequency not only the fundamental mode, but also higher modes. The different signal propagation times of the different modes produce echoes which distort the measurement signal.

It may not be possible to reconcile the requirement for reducing the sensitivity to condensate droplets with the requirement for optimizing the transmission and reception characteristics at a particular HF signal frequency. Practical applications frequently call for a compromise between reducing the sensitivity to condensate droplets and adapting the device to a particular frequency. Accordingly, the dimensions of the waveguide and an antenna connected thereto should be selected so as to minimize the overall distortion of the measurement signal caused by, on one hand, the condensate droplets and, on the other hand, the multimode characteristics of the waveguide.

FIG. 5 shows a conventional mono-mode waveguide 10 and an antenna 20 having a funnel with a taper 14, with two condensate droplets 52 being formed on the taper 14. FIG. 6 shows a waveguide/antenna arrangement having dimensions which are greater than those of the arrangement of FIG. 5 to reduce the sensitivity to condensate droplets. However, the arrangement of FIG. 6 can also produce higher order waveguide modes.

It would therefore be desirable to provide an optimized arrangement with a waveguide and an antenna connected to the waveguide, which reduces the sensitivity to condensate droplets while at the same time optimizing the electrical characteristics.

SUMMARY OF THE INVENTION

According to one aspect of the invention, the waveguide is dimensioned as a mono-mode waveguide with respect to the particular frequency of the transmitted signal, while the antenna has multimode characteristics. A first taper is disposed between the waveguide and the antenna. The first taper is dimensioned so as to either entirely suppress modes higher than the fundamental mode, or to at least generate only a small number of such higher modes.

In other words, in order to mitigate the adverse effects caused by water droplets, the feed waveguide is monomode, whereas the antenna system connected to the waveguide has dimensions which are large enough to support multimode radiation. Furthermore, the first taper disposed between the waveguide and the antenna system is dimensioned so as to suppress most, if not all, modes higher than the fundamental mode.

The first feature of the invention, namely to design the antenna as a multimode antenna, makes the antenna considerably less susceptive to condensate droplets. Moreover, the second feature of the invention, namely to dimension the waveguide as a mono-mode waveguide, the third feature of the invention, namely to connect the antenna with the waveguide through a taper, and the fourth feature of the invention, namely to dimension the taper so that it transmits only the fundamental mode of the HF signal, causes the entire arrangement of waveguide, taper and antenna to operate mono-mode in the fundamental mode only, in spite of the likely multimode characteristics of the antenna.

When the apparatus of the invention is used for level measurements, the sensitivity to condensate droplets is reduced due to the relatively large antenna size, while at the same time echoes, which can distort the measurement signal, are eliminated in spite of the multimode characteristics of the antenna.

The invention therefore advantageously satisfies the conflicting requirements which conventional devices are unable to reconcile, namely an inconsequential effect of condensate droplets combined with an optimized transmission and reception characteristics. Since this invention does not sacrifice sensitivity to condensate droplets at the expense of optimized electrical properties, the measurement signal is free from distorting echoes, while condensate droplets cause only a small disturbance.

DETAILED DESCRIPTION OF CERTAIN ILLUSTRATED EMBODIMENTS

Figure 1:
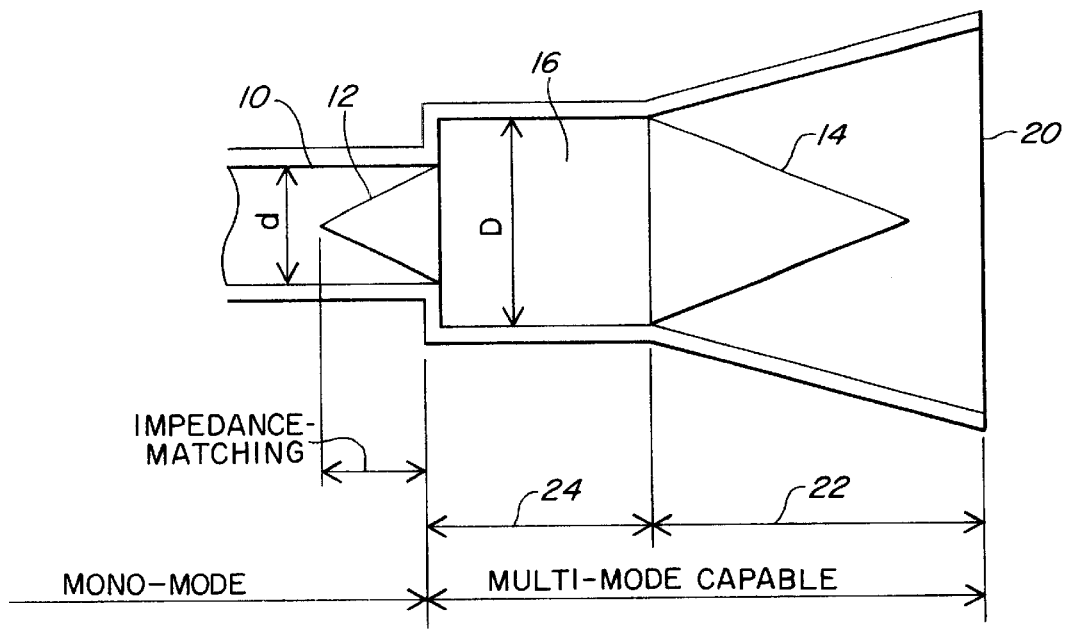
FIG. 1 shows a first embodiment of the invention.

Referring to FIG. 1, in a first embodiment according to the invention, a first taper 12 which has the form of, for example, a pyramid or a cone, is inserted at one end of a waveguide 10 which is filled with air. The first taper 12 is tapered towards the interior space of a waveguide 10. An antenna 20, which may be implemented as a horn antenna or funnel antenna, is connected to the taper 12.

A second taper 14 which has the form of, for example, a pyramid or a cone, is disposed in the funnel of the antenna 20. The tip of the taper 14 points in the direction of the radiation, whereas the tip of the first taper 12 points in the opposite direction into the waveguide 10. As seen in FIG. 1, the antenna 20 is formed as a horn radiator and has a first section 22, which expands towards the radiating direction, and a subsequent second section 24 following the first section 22 in the direction of the waveguide. The second section 24 has a constant diameter D. In the illustrated embodiment, the diameter D of the second section 24 is significantly greater than the diameter d of the waveguide 10. The second section 24 of the antenna is completely filled with a dielectric material 16. The two tapers 12 and 14 described above are connected to the respective end faces of the dielectric material 16, preferably without the presence of an air gap. Advantageously, the two tapers 12 and 14 together with the interposed dielectric material 16 are formed as one piece.

As mentioned above, the dimension of the cross-section and/or the diameter d of the waveguide 10 are selected so that the waveguide 10 operates mono-mode. The dimension of the cross-section and/or the diameter d of the waveguide 10 are therefore smaller than the cross-section and/or the diameter D of section 24 of the antenna 20 which has a larger surface area to mitigate the adverse effects caused by condensate droplets. The waveguide 10 can be a circular waveguide or a rectangular waveguide.

Figure 2:
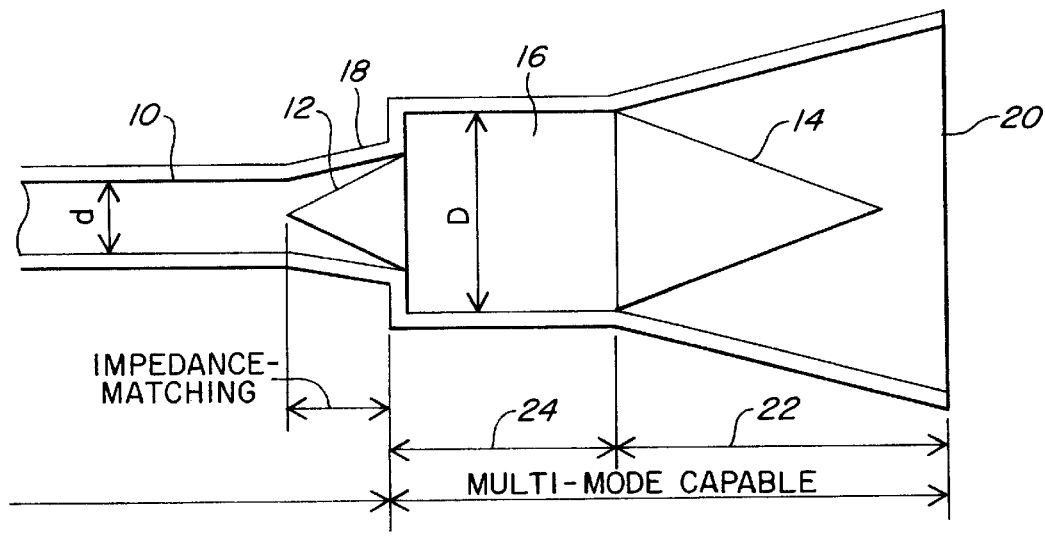
FIG. 2 shows a second embodiment of the invention.

The embodiment depicted in FIG. 2 is similar to the first embodiment of FIG. 1, except that the cross-section of the waveguide 10 increases in a transition region 18, forming a cone or a pyramid, until this cross-section becomes equal to the cross-section of the antenna 20. The taper 12 projects into the waveguide 10 as in the first embodiment.

Figure 3:
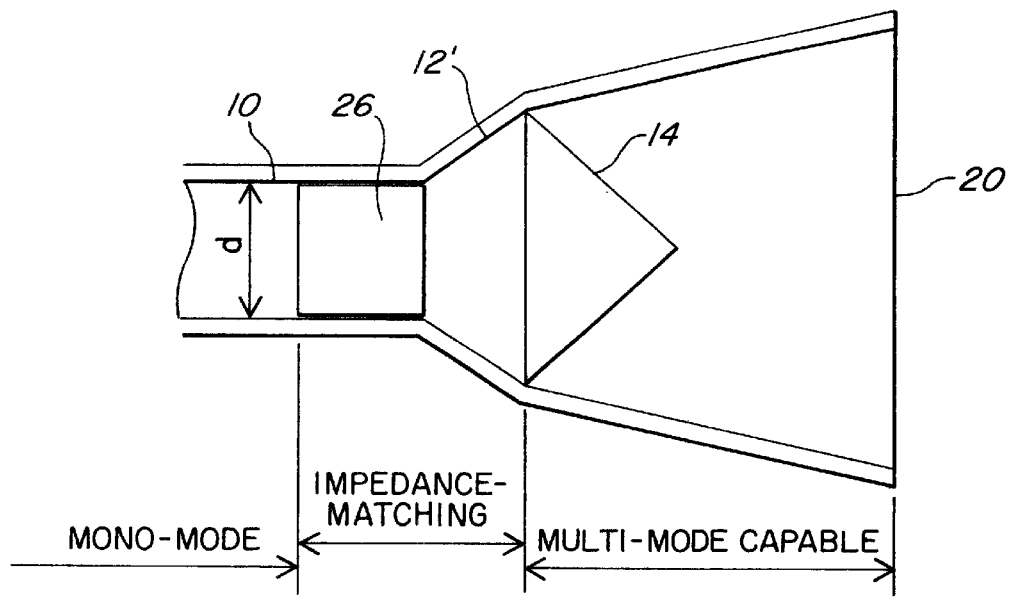
FIGS. 3 and 4 show a third and a fourth embodiment of the invention.

In the third embodiment depicted in FIG. 3, a second taper 14 following a first taper 12' is placed inside the funnel of the antenna 20, with the cross-section of the first taper 12' narrowing towards the waveguide 10. The taper 12', however, does not terminate in a pointed tip. Instead, the taper 12' narrows only to a cross-section which corresponds to the cross-section of the waveguide 10. The taper 12' has a shoulder 26 adapted to receive the waveguide 10, which is filled with a dielectric material, forming a snug fit with the waveguide 10. The shoulder 26 has a constant diameter.

Figure 4:
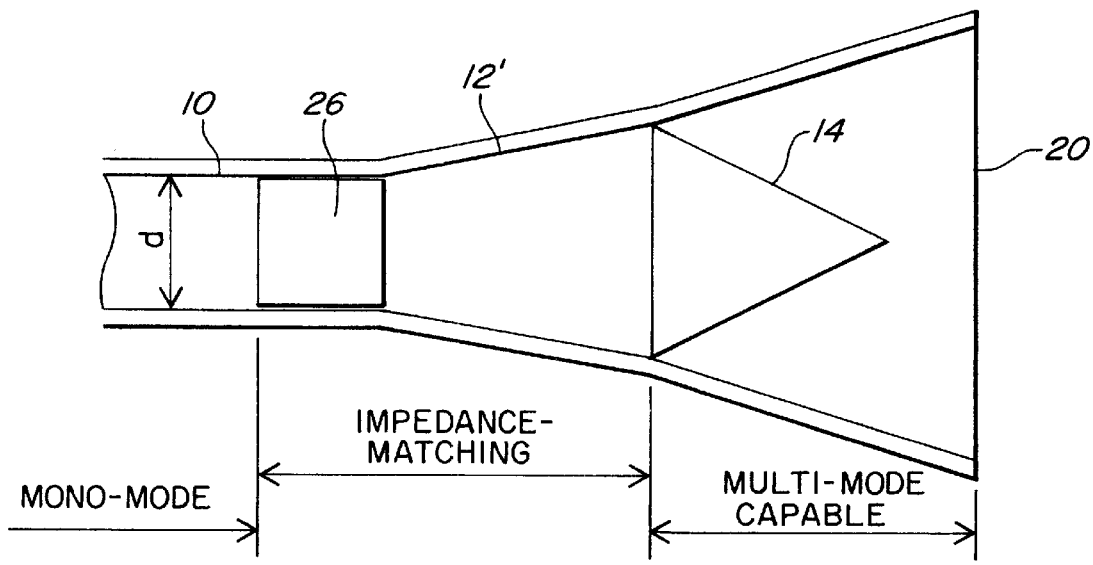
Figure 5:
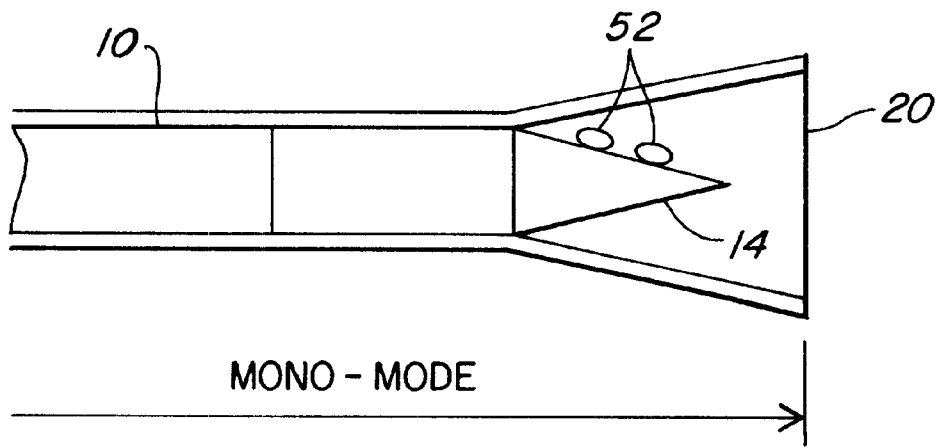
FIGS. 5 and 6 show a prior-art arrangement of a waveguide and an antenna.
Figure 6:
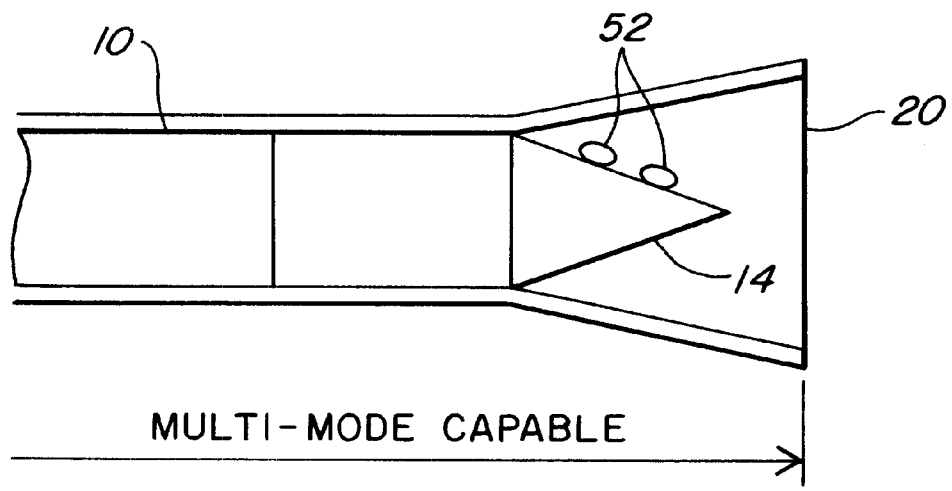

FIG. 4 shows an embodiment which is similar to the embodiment of FIG. 3, but has different dimensions.

In all embodiments of the invention, both tapers 12 and 14 can be formed in one piece and of a single dielectric material. The invention can be used with horn antennas, parabolic antennas and rod antennas. The waveguides can be circular waveguides or rectangular waveguides.

Although the invention is particularly suited for level measurement devices, it is not limited to applications of this type. The invention can advantageously be employed wherever and for whatever reasons a multimode antenna at a particular frequency is required. According to the invention, a mono-mode waveguide can be employed because the taper restricts the transmitted and received signals in the waveguide and in the antenna to the fundamental mode, while the antenna itself may be capable of supporting multiple modes.

We claim:

1. An apparatus comprising:
   a waveguide,
   an antenna,
   an intermediate housing disposed between said waveguide and said antenna, said intermediate housing having a cross-section which increases in the direction of said antenna; and a solid dielectric material which completely fills said intermediate housing, with a first taper extending at least partly into said waveguide and a second taper extending into said antenna with a decreasing cross-section.

2. The apparatus according to claim 1, wherein the first taper is terminated in a pointed tip, with the pointed tip projecting into an interior space of the waveguide.

3. The apparatus according to claim 1, wherein a cross-section of the antenna decreases towards the waveguide so as to match a cross-section of the waveguide.

4. The apparatus according to claim 1, wherein the first taper has two end sections and is formed of a solid dielectric material, wherein an inner wall of the waveguide is disposed on a first end section of the first taper to form a close fit between the waveguide and the first end section, and wherein the antenna is disposed on the other end section of the first taper, with a cross-section of the other end section matching a cross-section of the antenna at a common contact surface.

5. The apparatus according to claim 1, further comprising said second taper disposed in a funnel of the antenna, with the cross-section of the second taper decreasing in the radiation direction of the antenna.

6. The apparatus according to claim 5, wherein the first taper and the second taper are made in one piece of a single dielectric material.

7. The apparatus according to claim 1, wherein the antenna is selected from the group consisting of horn antenna, parabolic antenna and rod antenna.

8. The apparatus according to claim 1, wherein the waveguide is a circular waveguide or a rectangular waveguide.

9. The apparatus of claim 1, wherein the first taper includes a shoulder adapted to engage the waveguide.

10. The apparatus of claim 1, wherein said waveguide has a cross section which increases in the direction of said antenna.

11. The apparatus of claim 1, wherein said waveguide has a cross section of constant diameter.

12. The apparatus according to claim 1, wherein a cross-section of the first taper decreases from the antenna towards the waveguide.

* * * * *